March 17, 1931. J. E. HIRST 1,796,369
SUPPORT AND SLIDE FOR ENDLESS FEED CHAINS OF SAWING MACHINES AND THE LIKE
Filed June 27, 1930 2 Sheets-Sheet 1
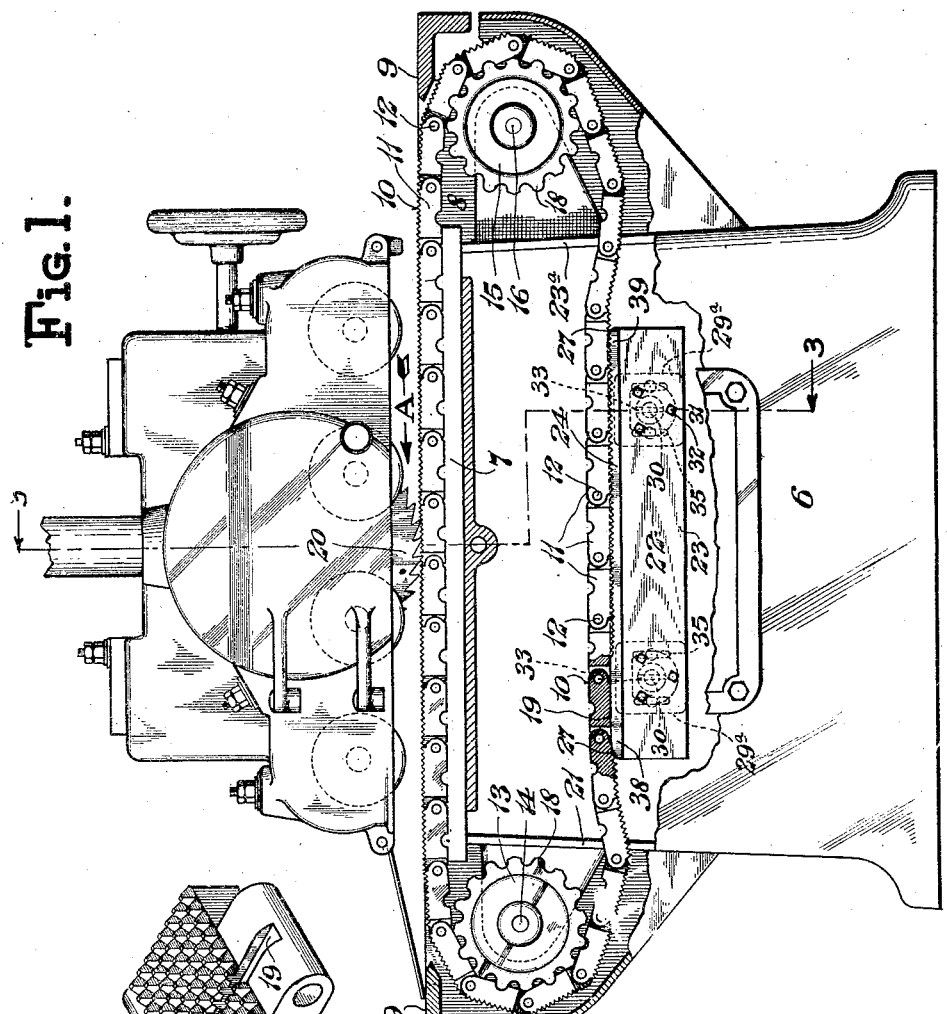
INVENTOR.
James E. Hirst
BY
ATTORNEY.

March 17, 1931.   J. E. HIRST   1,796,369
SUPPORT AND SLIDE FOR ENDLESS FEED CHAINS OF SAWING MACHINES AND THE LIKE
Filed June 27, 1930    2 Sheets-Sheet 2
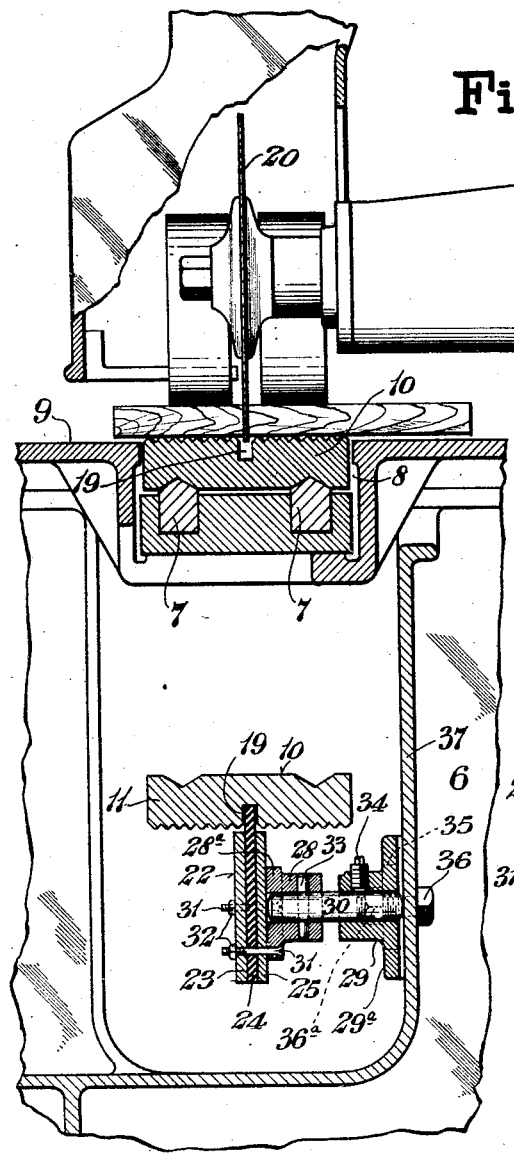
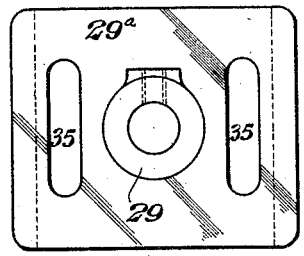
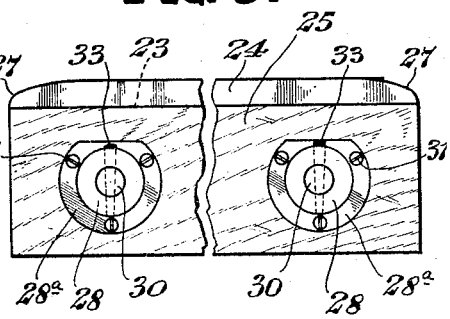
INVENTOR.
James E. Hirst
BY
ATTORNEY.

Patented Mar. 17, 1931

1,796,369

UNITED STATES PATENT OFFICE

JAMES E. HIRST, OF CINCINNATI, OHIO, ASSIGNOR TO THE J. A. FAY & EGAN COMPANY, OF CINCINNATI, OHIO, A CORPORATION OF WEST VIRGINIA

SUPPORT AND SLIDE FOR ENDLESS FEED CHAINS OF SAWING MACHINES AND THE LIKE

Application filed June 27, 1930. Serial No. 464,368.

This invention relates to a combination support and slide for the endless feed chain of a power actuated rip sawing machine or the like, and the object of the invention, generally stated, is to produce a device associated with and adapted to support the lower run or course of said chain and in a measure guide it, thus eliminating the side motion and "whip", as it is commonly called, which has heretofore been present in machines having feed chains traveling at comparatively high speeds.

In endless feed chains used in connection with power actuated rip sawing machines or the like it is necessary to have a groove in the outer or work supporting face of the chain to receive the saw or like cutting tool so that the stock moved through the machine by said chain can be completely severed when desired. These chains usually comprise a series of blocks linked together with their outer faces knurled or ribbed to insure positive feeding of the stock through the machine. For some time past manufacturers have endeavored to eliminate the "whip" imparted to the lower run of endless feed chains of the class above referred to, by providing a plurality of wooden rollers beneath the lower run of the chain. This method, however, has several serious objections, i. e., with wooden rollers used for supporting the lower run of the chain and due to the speed with which the chain is driven considerable noise takes place in the passing of the knurled faces of the blocks of the chain over said rollers and in a very short period of time the wooden rollers become so badly worn by the knurled faces of the blocks of the chain passing thereover that it is necessary to replace them by new rollers and, further, the rollers did not eliminate the side motion and "whip" of the lower run of the chain.

With the present invention I aim to overcome all of the above noted disadvantages in supporting the lower run of endless feed chains for power actuated rip sawing or like machines.

My invention consists in a supporting slide for endless feed chains having a longitudinal groove in its outer face comprising a member located and supported beneath the lower run of said chain and engaging said groove.

My invention also consists in the combination, location and arrangement of parts as set forth and claimed.

In the accompanying drawings:

Fig. 1 is a side elevational view partly in section of a rip sawing machine embodying my invention;

Fig. 2 is an isometric detail of one of the blocks comprising the endless feed chain;

Fig. 3 is a fragmentary cross section taken on a plane corresponding to line 3—3 of Fig. 1, this figure being drawn on a somewhat larger scale than Fig. 1;

Fig. 4 is a detail view of one of the adjustable flanges; and

Fig. 5 is a side elevation of the support and slide partly broken away between its ends and showing its flanges and their shafts.

As shown by the drawings, the machine selected for purposes of illustration is a power actuated rip sawing machine, although the mentioning of any particular machine is not to be regarded as limiting the invention in any manner whatsoever as it can be used upon any machine employing an endless feed chain having a continuous longitudinal groove in its outer periphery.

As best seen in Fig. 3, the power actuated rip sawing machine, embodying my invention, comprises a frame 6 constructed to support inverted V rails 7 within the chain runway 8, the latter being formed in the top 9 of frame 6 to receive the endless feed chain 10. This chain 10 is usually composed of a series of blocks 11 linked together as by pins 12 and running over a driving sprocket 13 mounted upon the shaft 14 at the rear end of the machine and connected with a suitable source of power and an idler sprocket 15 rotatably mounted upon shaft 16 at the front end of the machine. In Fig. 2 one of the blocks 11 is shown in detail and by reference to this figure it will be seen that one face of the block is deeply knurled and the opposite face provided with a transverse groove 17 which receives the rounded teeth 18 of sprockets 13 and 15, respectively, as clearly illustrated in Fig. 1. The knurled surface of each block is provided with a longitudinal groove 19 to receive the cutting tool as, for example, the circular saw blade 20.

The upper run of the chain 10 in passing from the idler sprocket 15 slides upon the rails 7 and passes through the runway 8 in the top 9 of frame 6 in the direction of arrow A and then passes over driving sprocket 13. The lower run of said chain 10 in passing from the driving sprocket 13 passes through an opening 21 in the rear wall of the frame 6 and thence forwardly through the frame and over the combined support and slide 22 passing through opening 23a in the front wall of frame 6 and thence upwardly and over idler sprocket 15.

The construction, arrangement, location and operation of the combined support and slide 22 will now be described in detail, as it is in this member that the present invention particularly resides.

The support and slide 22, which is best shown in Figs. 3 and 5, consists of three elongated layers of superimposed wood 23, 24 and 25, respectively. The outer layers 23—25 are preferably made of poplar, rock maple or similar hard wood, while the center layer 24 is preferably made of lignum vitæ or similar hard wood. As clearly shown in Fig. 3, the center layer 24 of the support and slide 22 projects above the outer layers 23—25 and is received by the longitudinal groove 19 in blocks 11 of endless feed chain 10. The ends of center layer 24 are preferably rounded somewhat as at 27—27 (Fig. 5) to insure a smooth travel of the chain 10 as it rides upon and off of said layer.

The layers 23, 24 and 25, respectively, are adjustably supported beneath the lower run of chain 10 in any suitable manner so that center layer 24 is in longitudinal alinement with the groove 19 in blocks 11 of endless feed chain 10.

The means shown for adjustably supporting the layers 23, 24 and 25, respectively, comprise a pair of flanged bosses 28 and 29 and shaft 30. The boss 28 is securely fixed to the outer face of layer 25 by bolts 31 passing through the flange 28a of said boss and layers 25, 24 and 23, respectively, and nuts 32 received by the threaded ends of said bolts, as clearly shown in Fig. 3. One end of shaft 30 is received by a hole bored in the boss 28 and securely held therein as by pin 33. Thus the boss 28 and shaft 30 are rigidly attached to the support and slide 22. The other end of shaft 30 is received by a hole bored in the boss 29 and is adjustably held therein as by the set screw 34. The flange 29a of flanged boss 29 is provided with parallel spaced apart slots 35 to receive the bolts 36, which bolts are passed through holes in wall 37 of frame 6. Nuts 36a are provided for bolts 36 and by this means the flanged boss is secured to the wall 37 and can be adjusted vertically by the bolts working in the slots 35.

By a study of Fig. 1 it will be seen that the blocks 11 in passing from the driving sprocket 13 ride up upon end 38 of center layer 24 and are supported by said layer until they ride off of end 39 thereof.

This layer or board 24, as before explained, is lignum vitæ or like hard wood and is received by the longitudinal groove 19 in endless feed chain 10 and, therefore, not only supports the weight of the lower run of chain 10, as shown in Fig. 1, but guides it and prevents side motion and "whip", as it is more commonly called.

As shown in Fig. 2, the groove 19 in the blocks of chain 10 is smooth and, therefore, very little wear occurs upon the upper edge of center layer 24, as in the case where wooden rollers are used, and brought into contact with the knurled surface of the blocks 11, as previously described.

While I have shown and described one embodiment of my invention, it is to be understood that I do not wish to limit myself to the center layer 24, operating in the groove 19 of chain 10, as rollers may be employed providing they are constructed to operate within said groove 19 and not come into contact with the knurled surfaces of blocks 11.

However, after much experiment, I believe the lignum vitæ layer 24 the ideal method as it supports the lower run of the chain 10 at all points, whereas rollers would only support the chain at predetermined points.

What I claim is:

1. A combined support and slide for an endless feed chain having a longitudinal groove in its outer face comprising a member located and supported beneath the lower run of said chain and engaging said groove only.

2. A combined support and slide for an endless feed chain of rip-sawing machines and the like comprising a member substantially elongated in form and located and adjustably supported beneath the lower run of said chain and received by a longitudinal groove in the outer periphery of said chain.

3. In combination with the lower run of an endless feed chain having a longitudinal groove in its outer work supporting face, a combined support and slide mounted beneath the lower run of said chain and adapted to enter said groove in the manner specified.

4. In combination with the lower run of an endless feed chain having a longitudinal groove in its outer work supporting face, a combined support and slide mounted beneath the lower run of said chain and adapted to enter said groove and comprising an elongated member, and means for adjustably supporting said member with respect to said chain.

5. In combination with the lower run of an endless feed chain for power actuated rip-sawing machines and the like having a longitudinally extending tool groove in the work supporting face, a combined support and slide therefor comprising an elongated relatively thin member disposed vertically within said machine and located beneath said chain and received by said groove and means capable of adjusting said member within said groove, substantially as described.

6. The combination of a power actuated rip-sawing machine, an endless feed chain having a tool receiving groove in its work supporting face, and means located beneath the lower run of said chain adapted to engage said groove only, to thereby support and guide said lower run of said chain.

7. A combined support and slide for an endless feed chain having a longitudinal groove in its outer face comprising a member located and supported beneath the lower run of said chain and engaging said groove.

JAMES E. HIRST.